Nov. 18, 1941.                L. W. WACHTER ET AL                2,263,199
                                  LOADING BODY
                              Filed Aug. 28, 1940              4 Sheets-Sheet 1

Inventors.
Lester W. Wachter.
Lawrence E. Walker.
by Parker & Carter
           Attorneys.

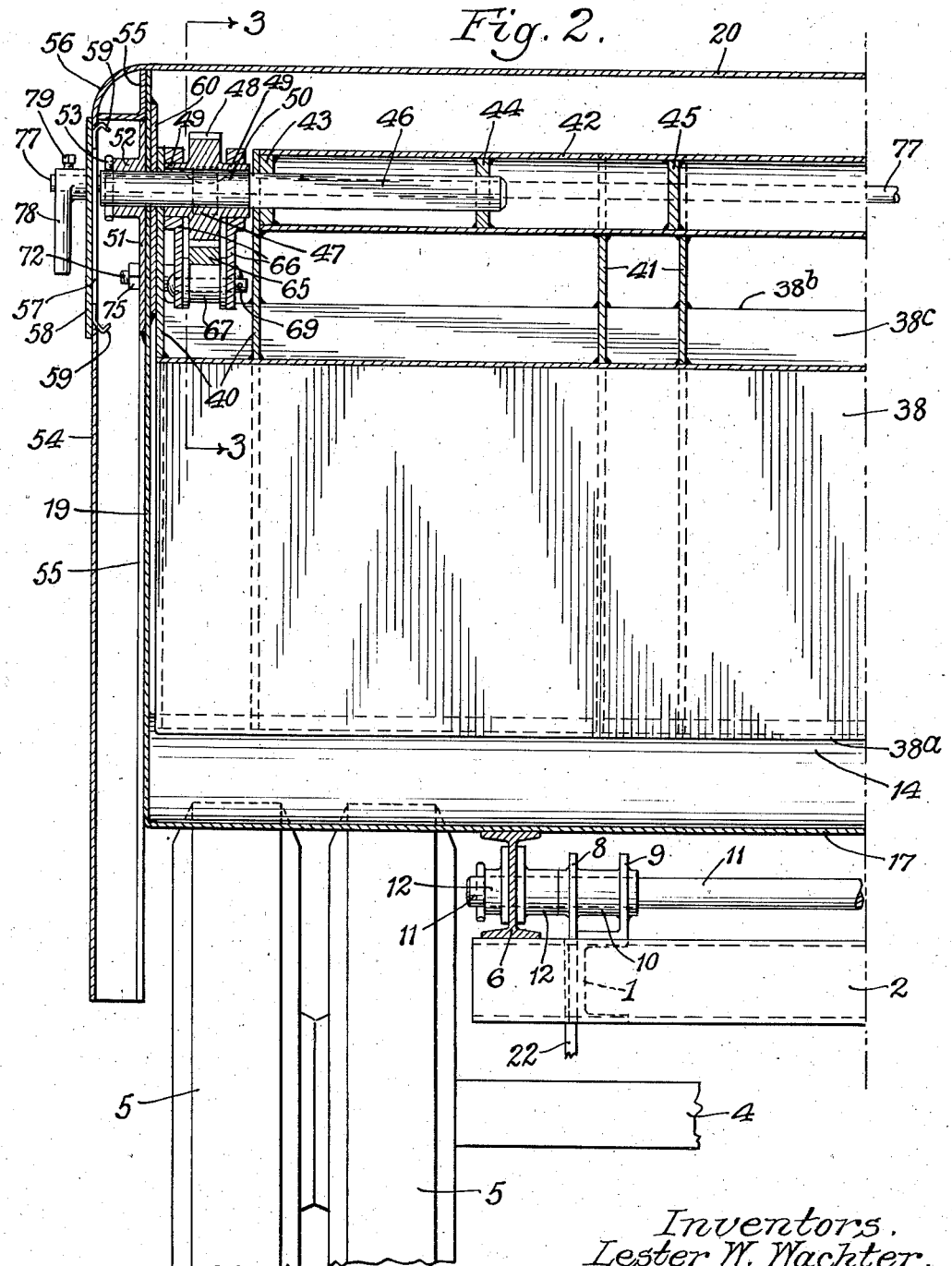

Nov. 18, 1941.    L. W. WACHTER ET AL    2,263,199
LOADING BODY
Filed Aug. 28, 1940    4 Sheets-Sheet 3
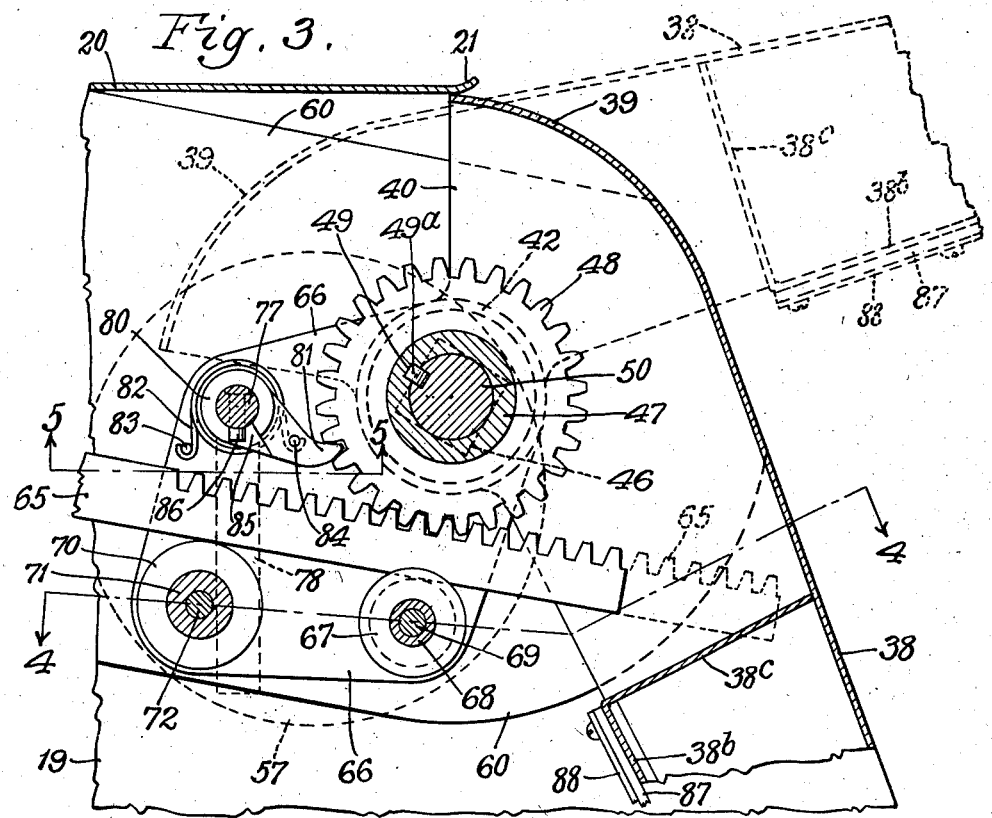
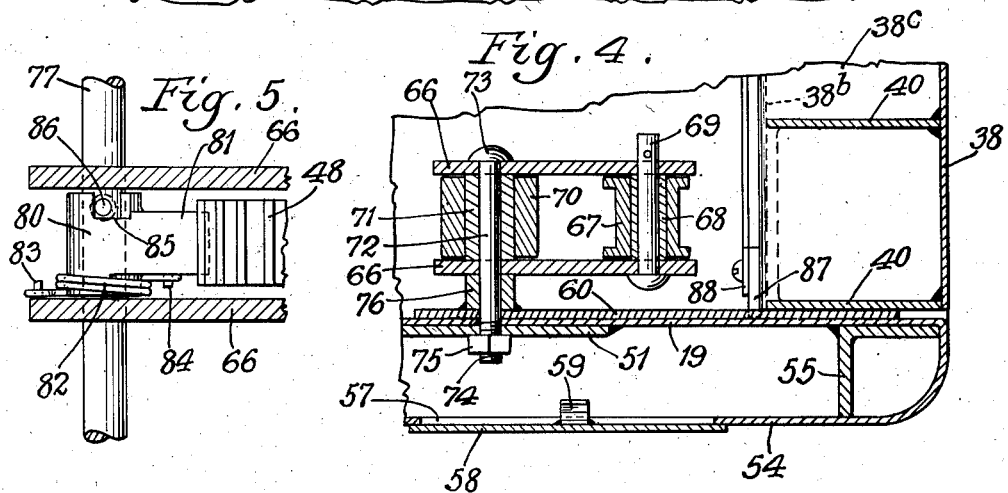
Inventors.
Lester W. Wachter.
Lawrence E. Walker.
by Parker & Carter
Attorneys.

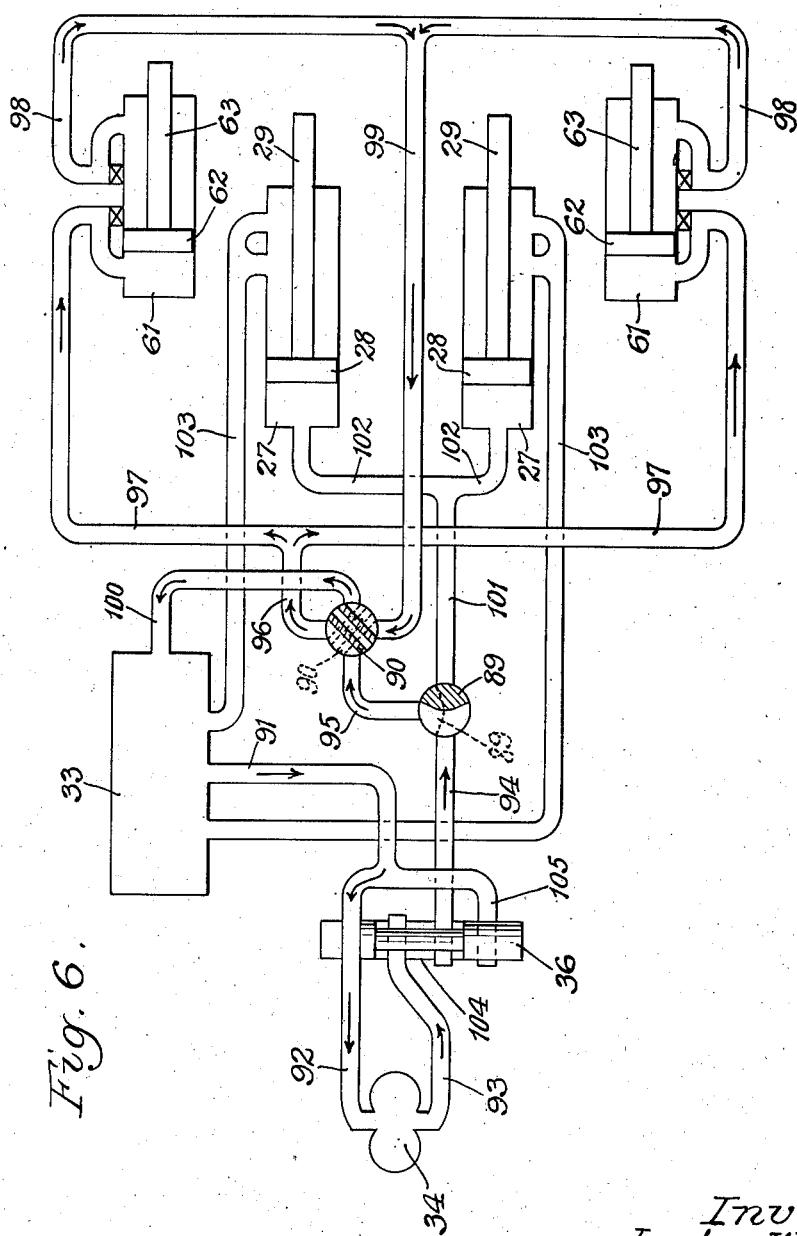

Patented Nov. 18, 1941

2,263,199

UNITED STATES PATENT OFFICE 2,263,199

LOADING BODY

Lester W. Wachter and Lawrence E. Walker, Streator, Ill., assignors to Anthony Company, Streator, Ill., a corporation of Illinois Application August 28, 1940, Serial No. 354,594

19 Claims. (Cl. 214—67)

This invention relates to a vehicle body and particularly to a vehicle body provided with a movable closure and means for making that closure serve as a packer as well as a closure. Another object is to provide, in connection with a vehicle, a tipping body having a closure, and to provide means for operating that closure as a packer. Another object is to provide a vehicle body so arranged that it retains a part of its contents even when open. Another object is to provide in a vehicle body contents-retaining means for the main contents and a retaining space to receive material to be put into the body.

Other objects will appear from time to time throughout the specification and the claims.

The invention is illustrated more or less diagrammatically in the accompanying drawings, wherein:

Figure 2 is a transverse vertical section taken at line 2—2 of Figure 1 on an enlarged scale;

Figure 3 is a longitudinal vertical sectional detail taken at line 3—3 of Figure 2 on a further enlarged scale;

Figure 4 is a generally horizontal sectional detail taken at line 4—4 of Figure 3;

Figure 5 is a generally horizontal sectional detail taken at line 5—5 of Figure 3;

Figure 6 is a schematic diagram of one form of a hydraulic system for operating the mechanism disclosed.

Like parts are designated by like characters throughout the specification and the drawings.

Figure 1:
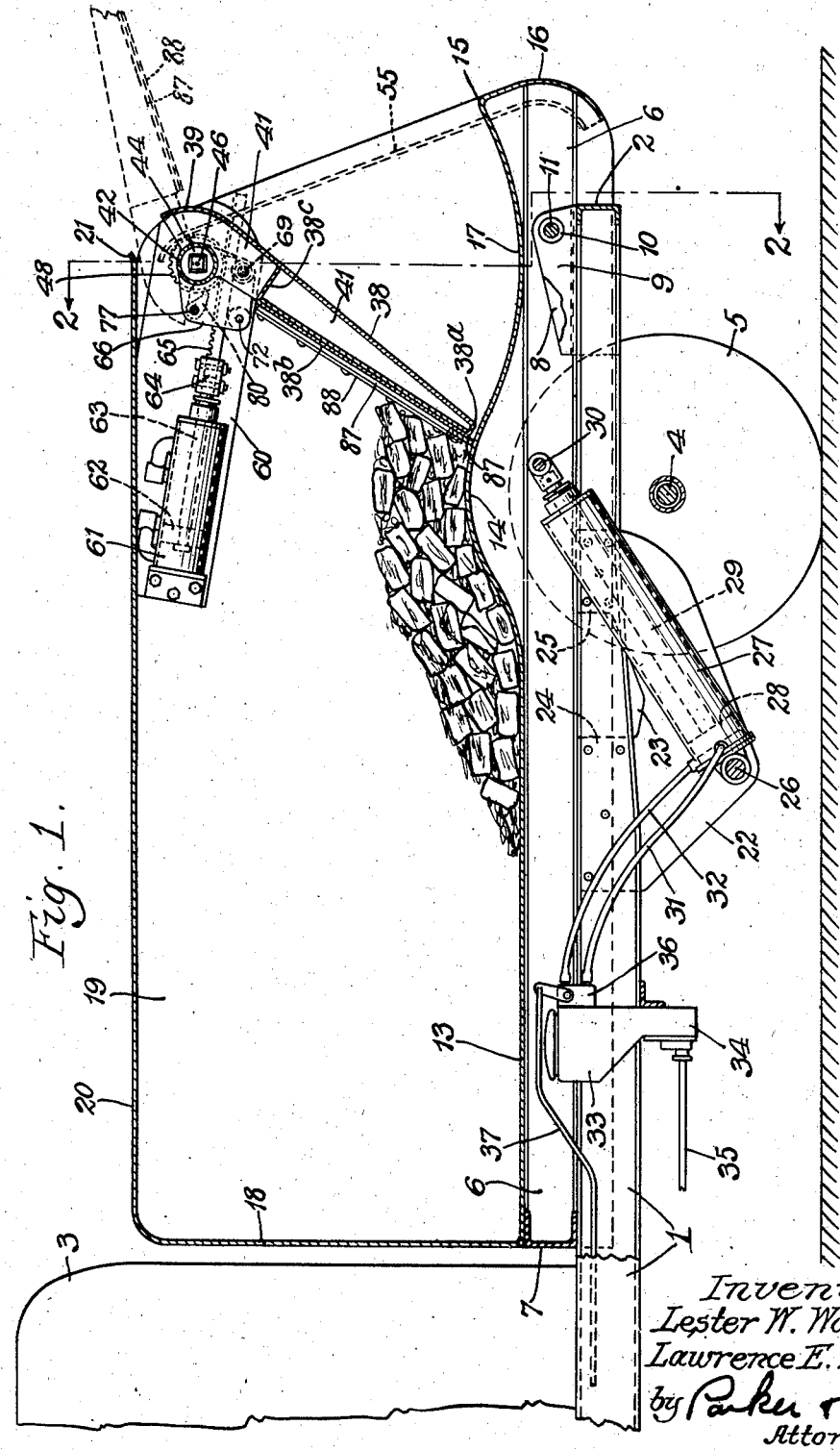
Figure 1 is a longitudinal vertical section showing one form of the present invention.

The invention may be applied to a vehicle or may be applied on a fixed platform which does not move. As shown, it is applied to an automotive vehicle although, of course, the vehicle might not be automotive. Only as much of the vehicle is shown as is necessary to show the operation of the present invention. As shown, the vehicle includes a frame having longitudinal members 1, 1 and one or more cross members 2. There may be a cab 3 and an engine is preferably provided. The engine is not shown as its details form no essential part of the present invention. The vehicle is provided with an axle 4 on which wheels 5 are mounted. The driving means are not shown as they form no essential part of the invention.

As shown, the body comprises a frame formed of longitudinal members 6 and one or more cross members 7. Plate-like members 8 are secured to each of the longitudinal frame members 1 and they may be reenforced by members 9. Between these members are positioned bearings 10 in which a shaft 11 is journaled. Bearings 12, 12 are secured preferably at each side of each of the frame members 6 and the shaft 11 also extends through these bearings. The shaft 11 and the bearing parts 8, 9, 10 and 12 furnish a pivotal bearing for the dumping body which will be described below.

The dumping body includes or is positioned upon the frame made of the frame members 6 and 7. In the particular form shown, the dumping body includes a bottom member 13, which is raised as at 14 and as at 15. It may be downwardly curved or bent as at 16 to furnish a smooth rear lower portion for the body. Between the portions 14 and 15 is a depression 17 and a main floor portion 18 is depressed forwardly of the raised portion 14, as shown particularly in Figure 1.

The body includes a forward portion 18, sides 19 and a cover portion 20. These parts may be made in a variety of ways and the invention is not limited to their particular details. The body may even have an open top, if desired. At its rear end the top or cover portion 20 is upwardly bent as at 21.

While, as above mentioned, the invention is not limited to its application upon a tipping body, as here shown, the body tips. A plate or similar member 22 is preferably mounted on each of the side frame members 1. The plate may be cut away as at 23, if desired, and secured to the frame members 1 at the portions 24 and 25 only.

A shaft 26 is mounted in the two plates 22 and extends across between them. One or more, preferably two, hydraulic cylinders 27 are mounted upon the shafts 22 to turn with respect to them. A piston 28 is mounted in each of the cylinders. A piston rod 29 extends outwardly from each of the cylinders 27 and is journaled upon a cross shaft 30 which extends between the frame members 6. Pressure fluid is supplied to and withdrawn from each cylinder 27, respectively, by conduits 31 and 32 which communicate with a pump assembly which includes a reservoir or sump 33 and a pump portion 34, which latter is driven by a shaft 35 from the power takeoff of the engine or from any suitable source of power. A valve assembly 36 may be attached to the pump assembly and is controlled by a shaft or reach rod 37 which operates from any suitable control position. Any desirable raising means or tipping means may be used and it may be hydraulic or mechanical.

The invention is not limited to any particular raising or dumping mechanism. The particular hydraulic system illustrated herewith will be described in more detail below.

A gate and packing element is mounted within the body and means are provided for moving it. As shown, the gate includes a platelike member 38 which may at its upper edge be curved as at 39. Preferably, the gate has front and rear sections. They may be made of several separate plates or the plate 38 may be bent at its bottom as at 38a to form rear plate 38b which is bent as at 38c to join or contact the main plate portion 38. The gate includes at least two side frame members 40 to which the platelike portion 38, 39 is fastened. It includes also a plurality of stiffening frame members 41, 41. The members 41 are joined at their upper ends to a tube 42 which forms in effect a backbone for the gate. At each end of the tube there is mounted a perforated plate 43 and adjacent each of these is a second perforated plate 44. Positioned inwardly from each of the plates 44 is a stop plate 45 which is not perforated. At each side of the body and at each end of the tubular backbone 42 there is inserted a rod 46. This rod is square throughout a portion of its length and has keyed upon it a hub 47. Formed upon this hub 47 is a pinion 48. At each side of the pinion portion 48 the hub 47 is provided with enlargements 49, 49. The rod which is square throughout the portion of its length indicated by the numeral 46 is round throughout the portion of the length indicated by the numeral 50 and it is upon the round portion that the hub is positioned and keyed. Each of the side members 19 of the dumping body is provided with a reenforcing plate 51 from which a perforated boss 52 extends outwardly. This boss serves as a bearing for the outer end of the rod 46, 50, which may be held in place by a cotter pin 53. As a means for improving the appearance of the body and for covering and enclosing certain operating mechanism such as the boss 52 and the ends of the shafts 50 and for other purposes the body may have additional outer plates 54. These are spaced away from the inner side plates 19 and may be supported by angles 55. The top plate 20 may be bent downwardly as at 56 to enclose the angle 55 and join the outer side plate 54. An opening 57 is left in each side plate 54 opposite the shafts 50 and associated parts, and it may be removably closed by a closure plate 58 which is provided with springs 59 by means of which it may be sprung into and held in place removably.

As a means for opening and closing and otherwise moving the gate, there are provided two hydraulic cylinders. Each of these and preferably its associated parts are carried on plates 60, one of which is mounted upon the inner surface of each wall 19. To each of these is secured a cylinder 61 within which is mounted a piston 62 from which a piston rod 63 extends outwardly. Secured to each piston rod 63 by a coupling 64 is a rack 65. Each of these racks meshes with one of the pinions 48.

As a means for holding each rack in suitable engagement with its pinion, the following mechanism is provided:

Upon each hub portion 47 there is mounted a platelike member 66. Between each pair of plates 66 is mounted a flanged roller 67 which is carried upon a bushing 68 supported upon a pin 69. There is also mounted between each pair of plates 66 a second roller 70 carried upon a bushing 71 which is held in place by a pin 72. As will be seen in Figure 4, the pin is headed as at 73 and extends outwardly through the side wall 19 and the member 51, is threaded exteriorly as at 74 to receive a nut 75. A boss 76 is secured to the inner face of the plate 60. The effect of the two rollers of each pair is to make sure that each rack remains in engagement with its respective pinion.

For some purposes, it is desirable to provide a safety means which insures that the gate can under no circumstances fall open except upon the deliberate manipulation by the operator of the safety device. This mechanism is shown in Figures 2, 3 and 5 primarily and comprises a shaft 77 which is mounted for rotation in the plate 66 and through the side body plates 19 and 54. The shaft extends from side to side of the body and at each side projects outwardly and carries an operating handle 78 which is held in place in the form here shown by a set screw 79, although the handle might be otherwise secured. Loosely mounted on the shaft 77 between each pair of plates 66 is a dog 80. This dog has a nose or point 81 which engages the teeth of the pinion 48. As shown, a spring 82 is also positioned about the shaft 77, is pinned at 83 to one of the plates 66 and is pinned at its other end as at 84 to the dog. The spring tends normally to hold the dog in engagement with the teeth of the pinion 48. The dog is cut away as at 85 and a pin 86, which is positioned in the shaft 77, lies in this cutaway portion. The pin and the cut-away portion limit the relative movement of the dog and shaft. When the shaft is stationary the dog may only move sufficiently to permit it to ride over a tooth of the pinion 48. When, however, it is desired to lower the gate, the shaft 77 is rotated by means of either of the handles 78 and the dog is then positively moved out of engagement with the teeth of the pinion.

For some purposes it is desirable to provide means on the gate to prevent leakage of wet contents. Where that is desired, a rubber member 87 is secured on the inner face of the gate by means of a metal strip or plate 88. The rubber member 87 may be merely a strip overlying the edge of the gate or the member 87 might take any other desired form.

While the hoisting mechanism for tipping the body and the means for moving and swinging the gate may be of many forms, that illustrated in Figure 6 is one suitable form. As there shown, the pump 34 has associated with it the reservoir or sump 33 and a hoist control valve 36. This valve may be moved into position either to cause hoisting of the body or lowering or to hold the body stationary either in the upper or lower position; that is, in the raised or lowered position. In addition to the hoist control valve, there is a diverting valve 89, not shown in the other figures, by means of which fluid is diverted from the hoisting mechanism to the gate-operating mechanism, and there is a four-way packer or gate-operating valve 90 which may be moved to hold the gate stationary, to close it or to open it.

Fluid moves to the pump through low pressure conduits 91, 92, which bring the fluid to the gear pump 34. Fluid under pressure leaves the gear pump through the conduit 93 and moves thence to the control valve 36. If the valve is set to permit fluid to move toward either of the cylinder assemblies, it moves through the high pressure conduit 94 to the diverting valve 89. As that valve is shown in Figure 1, it diverts the fluid away from the hoisting cylinder assembly toward the gate-operating assembly. Pressure fluid then moves through the conduit 95 to the gate control valve 90, thence through the pressure conduit 96 to the two conduits 97, 97, each of which connects to one of the cylinders 61. As the pistons 62 are moved outwardly or toward the right, pressure from the opposite side of the cylinders 61 moves through the low pressure conduits 98, 98 to the main low pressure return conduit 99, thence to the gate controlling valve 90 and finally to the low pressure return conduit 100 to the sump or reservoir 33.

With the parts shown in Figure 6, the pistons are moved to the right and, considering the position of Figure 1, the gate will be moved from the full line position of that figure toward the dotted line position; that is to say, it will be opened.

To close the gate, the valves 36 and 89 are left in the position shown in Figure 6 and the valve 90 is reversed and is moved to the dotted line position. In that position pressure fluid moves just as it is described above, so far as the valve 90. From there, since the flow of fluid is to be reversed, it moves under pressure in the conduit 99 in the reverse of the arrows shown and thence through the conduits 98 to each of the cylinders 61 and forces the pistons in or to the left. When this action occurs, fluid is forced from the left side of the cylinders 61 backward through the conduits 97 in the opposite direction from the arrows, thence through the conduit 96 to the valve 90 and finally through the conduit 100 to the sump or reservoir. Thus, the valve 90 can be moved to cause the gate to open or close, or the valve may be positioned so that neither action takes place and so that fluid merely runs through the conduit 95, through the center of the valve 90, and through the conduit 100 to the reservoir. This action would permit the parts to operate or move but would hold the gate in whatever position it might be.

The valve 90 may be moved to that position when the gate is to be held in position. The valve 90 may also be moved to this position when a hoisting mechanism is to operate.

When the hoisting mechanism is to operate, the valve 89 is moved to the dotted line position and then pressure fluid moves from the housing of the valve 89 through the conduit 101 to the branch conduits 102, 102 and through each of them to a cylinder 27. The fluid under pressure forces the pistons 28 to the outer position, thus raising or tipping the body. Fluid to the right of the pistons 28 is forced outwardly by the movement of the pistons to the right and returns through conduits 103, 103 to the sump or reservoir 33. When the body is to be held in the tipped position, the control valve 36 may be manipulated to prevent return of fluid.

The hoist control valve 36, as shown diagrammatically in Figure 6, includes a housing 104, in which the valve element 36 itself is arranged to be moved. The passages or conduits 93 and 94 communicate with the housing 104, and these passages may be opened or closed by movement of the valve 36. The conduit 91, 92 also communicates with the valve housing 104 and may be opened or closed by the movement of the valve member 36. Similarly, a branch conduit 105, which communicates with the conduits 91, 92, also communicates with the valve housing 104 of the valve 36. Movement of the valve 36, therefore, controls the initial path taken by pressure fluid.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention are as follows:

While the invention may be embodied in a body which is mounted on a movable vehicle, it may, of course, be supported on a fixed mount.

If it be assumed that the invention takes the form here shown, it is applied to a garbage body which is mounted on an automative truck and the body is preferably arranged for tilting. It will ordinarily be tilted only for emptying. We are assuming now that the body is empty and it is desired to fill it. The vehicle will be stationary; the control valve 89 will be so handled that fluid will be directed away from the hoisting cylinders 27 and toward the gate moving cylinders 61. It will cause the pistons 62 to move outwardly and, thus, through the rack 65 and the pinions 48 to raise the gate from the full line position of Figure 1 or from any other intermediate position to or toward the dotted line position of Figure 1. With the gate in that position, the rear of the body is opened and garbage may be deposited. The rear of the body is low with respect to the ground. This is accomplished by the type of body mounting and by the type of body tilting means shown. The garbage can or cylinder receptacle has to be raised only a short distance to extend over the lip or raised edge 15. The garbage can is then tipped and the contents fall into the depression 17. The raised lip 15 prevents spilling or outward movement of the contents. When the garbage can has been dumped, the valve 90 is moved to reverse the direction of movement of the pistons 62 and the gate is moved backward toward and finally to the full line position of Figure 1, thus sweeping and carrying the material which has just been deposited in the depression 17 forward and into the body.

The gate may now be left in the full line position or, if desired, may be moved rearwardly to lie flush with the open end of the body. When more material is to be put into the body, the process above mentioned is repeated. The gate is opened; material is put into the rear of the body; the gate is manipulated to move the material forward; and the vehicle is driven further to another point for picking up other material.

As the vehicle becomes full, the movement of the gate in the forward direction packs the material in the body and compresses it. This has the advantage of making a relatively small body capable of carrying a relatively larger amount of material than would be the case without the packing or compressing action of the gate.

When it is desired to empty the body, for whatever reason, the gate is ordinarily opened—that is to say, it is moved to or toward the dotted line position of Figure 1—and the valve 89 is operated to direct pressure fluid to the tipping cylinders 27. These cylinders move the body to the tipped position and its contents may then fall out by gravity. After the body has been emptied, it is returned to the horizontal or untipped position, either by gravity or direct action, by pressure fluid within the cylinders 27 and the empty body is then ready for further use.

The hydraulic means schematically shown in Figure 6 are shown merely to illustrate one means for operating the various mechanisms shown. Generally speaking, it comprises a source of pressure fluid—that is to say, a pump—two hydraulic tipping cylinders and two gate-operating cylinders, together with the necessary conduits and controlling valves for operating the system. The cylinders may be provided with automatic check valves and with return passages and with means whereby, when a piston has moved approximately to the limit of its excursion, pressure fluid can be automatically by-passed and, therefore, the pump need not be stopped and the manual control valves need not be operated. Thus, in the case of the tipping cylinders, the conduits 103 have each two entrances to the cylinders 27; and when the pistons 23 have been forced outwardly far enough to clear the first of these entrances, fluid is discharged through it but the piston is held in its extreme position. These and other features of the hydraulic systems shown are advantageous but the invention is not limited to their use. It may be operated satisfactorily by other hydraulic means or by mechanical means.

Safety means are preferably also provided to prevent accidental closing of the gate and to prevent any downward movement of the gate except that under positive control. Should the operator move the controls to cause the pistons 62 to move inwardly to lower the gate, nothing would happen unless he has previously operated the handle 78 to unlatch the pinions 48. There will preferably be two such handles 78, one on each side of the body, one of which is shown in Figure 2. This handle 78 will be moved in clockwise direction from the position shown in Figure 3. When it has moved sufficiently to bring the pin 86 in contact with the opposite side of the space or hollow 85, further movement of the handle 78 will cause rotation of the shaft 77 and will lift the dog 81 out of contact with the pinion 48 and will free it for rotation, thus freeing the gate assembly for closing. Unless the dog is moved from the position of Figure 3, clockwise rotation of the pinion 48, which is necessary to lower the gate, is impossible because the dog 81 prevents it. Ordinarily, there are two dogs and two safety latching assemblies, one carried on each side of the body. While this safety means is ordinarily very desirable, the invention is obviously not limited to its use and it might be omitted without departing from the spirit of the total invention.

We claim:

1. In combination, a support, a body mounted thereon for tilting motion with respect thereto, means for tilting said body, said body having an opening through which material may be freely inserted and a combined gate and packing means mounted in said opening, said combined gate and packing means comprising the entire movable closure for said opening and means for bodily operating said combined gate and packing means, comprising means for moving it, under power in one direction to open said gate and to move it under power in the opposite direction to contact the contents of the body and force it away from the opening and to pack it.

2. In combination, a support, a body mounted thereon for tilting motion with respect thereto, means for tilting said body, said body having an open rear through which material may be freely inserted and a combined gate and packing means mounted in said open rear to close the same, said combined gate and packing means comprising the entire movable closure for said open rear and means for bodily operating said combined gate and packing means, including means to move said gate bodily in one direction to open it and to move it, bodily, in the opposite direction to contact the contents of the body and force it away from the opening and to pack it.

3. In combination, a support, a body mounted thereon for tilting motion with respect thereto, means for tilting said body, said body having side walls and an open rear through which material may be freely inserted and a combined gate and packing means mounted in said open rear to close the same, said combined gate and packing means comprising the entire movable closure for said open rear and means for bodily operating said combined gate and packing means, including means to move said gate bodily in one direction to open it and to move it, bodily in the opposite direction to contact the contents of the body and force it away from the opening and to pack it.

4. In combination, a support, a receptacle mounted thereon for movement with respect thereto, said receptacle having a bottom, said bottom shaped to provide a main retaining space and a receiving and retaining space, a raised portion of said bottom separating said two spaces, the receiving space being provided with a rear raised portion to prevent spilling of its contents, and a combined gate and packer positioned upon said body for bodily movement with respect thereto, and power means for positively moving said gate, to pack and to open.

5. In combination, a support, a receptacle mounted thereon for movement with respect thereto, and a combined gate and packer positioned upon said body for movement with respect thereto, said gate and packer comprising the entire movable closure for said receptacle and power means for positively and bodily moving said entire gate through its full limits for packing and opening, and means for tilting said body with respect to said support, said gate mounted to move into said body proper.

6. In combination, a support, a receptacle mounted thereon for movement with respect thereto, said receptacle having a bottom, said bottom shaped to provide a main retaining space and a receiving and retaining space, a raised portion of said bottom separating said two spaces, the receiving space being provided with a rear raised portion to prevent spilling of its contents, and a combined gate and packer positioned upon said body for movement with respect thereto, and power means for bodily moving said gate to pack and to open, and means for tilting said body with respect to said support.

7. In combination, a support, a receptacle mounted thereon for tilting movement with respect thereto, said receptacle having a bottom, said bottom shaped to provide a main retaining space and a receiving space, a raised portion of said bottom separating said two spaces, the receiving space being provided with a rear raised portion above the general level of said bottom to prevent spilling of its contents, and a combined gate and packer positioned upon said body for movement with respect thereto, and means for moving said gate, and means for tilting said body with respect to said support.

8. In combination, a support, a receptacle mounted thereon for movement with respect thereto, said receptacle having side walls, a front and a bottom, said bottom shaped to provide a main retaining space and a rearwardly positioned receiving space, a raised portion of said bottom separating said two spaces, the receiving space being arcuate and provided with a rear raised portion above the general level of said bottom to prevent spilling of its contents, and a combined gate and packer positioned upon said body for movement with respect thereto, and means for moving said gate, the arcuate portion of said receiving pocket being concentric with the path of movement of said gate and packer.

9. In combination, a support, a receptacle mounted thereon for movement with respect thereto, said recetpacle having side walls, a front and a bottom, said bottom shaped to provide a main retaining space and a rearwardly positioned receiving space, a raised portion of said bottom separating said two spaces, the receiving space being arcuate and provided with a rear raised portion above the general level of said bottom to prevent spilling of its contents, and a combined gate and packer positioned upon said body for movement with respect thereto, and means for moving said gate, the arcuate portion of said receiving pocket being concentric with the path of movement of said gate and packer, and means for tilting said body with respect to said support.

10. In combination, a support, a receptacle mounted thereon for movement with respect thereto, said receptacle having side walls, a front and a bottom, said bottom shaped to provide a main retaining space and a rearwardly positioned receiving space, a raised portion of said bottom separating said two spaces, the receiving space being arcuate and provided with a rear raised portion above the general level of said bottom to prevent spilling of its contents, and a pivotally mounted combined gate and packer positioned upon said body for movement with respect thereto, and means for moving said gate, the arcuate portion of said receiving pocket being concentric with the path of movement of said gate and packer.

11. In combination, a support, a receptacle mounted thereon for tilting movement with respect thereto, and a combined unitary gate and packer positioned upon said body for movement thereinto, and power means for positively moving said gate through its full limits for packing and opening, and means for tilting said body with respect to said support, and a single source of pressure fluid carried by said support, conduits leading from said source of pressure fluid to said body-tilting means and to said gate-moving means.

12. In combination, a support, a receptacle mounted thereon for movement with respect thereto, and a combined gate and packer positioned upon said body for movement with respect thereto, and power means for raising said gate to open it, and a safety control for said gate-moving means adapted to prevent accidental lowering of said gate, said power means, being effective to move said gate into said body proper.

13. In combination, a support, a receptacle mounted thereon for movement with respect thereto, and a combined gate and packer positioned upon said body for movement with respect thereto, and power means for raising said gate to open it, and means for tilting said body with respect to said support, and a safety control for said gate-moving means adapted to prevent accidental lowering of said gate, said power means, being effective to move said gate into said body proper.

14. In combination, a support, a receptacle mounted thereon for tilting movement with respect thereto, said receptacle having side walls, a front and a bottom, said bottom shaped to provide a main retaining space and a rearwardly positioned space, a raised portion of said bottom separating said two spaces, the receiving space being arcuate and provided with a rear raised portion to prevent spilling of its contents, and a pivotally mounted combined gate and packer positioned upon said body for movement with respect thereto, and means for moving said gate, the arcuate portion of said receiving pocket being concentric with the path of movement of said gate and packer.

15. In combination, a support, a receptacle mounted thereon for tilting movement with respect thereto, said receptacle having side walls, a front and a bottom, said bottom shaped to provide a main retaining space and a rearwardly positioned receiving space, a raised portion of said bottom separating said two spaces, the receiving space being arcuate and provided with a rear raised portion to prevent spilling of its contents, and a pivotally mounted combined gate and packer positioned upon said body for movement with respect thereto, and means for moving said gate, the arcuate portion of said receiving pocket being concentric with the path of movement of said gate and packer, and means for tilting said body with respect to said support, and a single source of pressure fluid carried by said support, conduits leading from said source of pressure fluid to said body-tilting means and to said gate-moving means, and controls for controlling the movement of said body and said gate, and a safety control for said gate-moving means adapted to prevent accidental movement of said gate.

16. In combination, an automotive vehicle, a vehicle frame, and means for propelling said vehicle, a body mounted upon said frame for tipping with respect thereto, selective hydraulic means for tipping said body, a movable unitary gate in said body to close the same, and a power means for positively moving said gate, said means adapted to move the gate rearwardly for opening and forwardly for closing and still further under power for packing, said gate mounted for movement into said body.

17. In combination, an automotive vehicle, a vehicle frame, and means for propelling said vehicle, a body mounted upon said frame for tipping with respect thereto, selective hydraulic means for tipping said body, a movable gate in said body to close the same, and a power means for positively moving said gate, said means adapted to move the gate under power rearwardly for opening and forwardly for closing and farther forward for packing, the bottom of said body shaped to provide a main retaining pocket and a receiving and retaining pocket.

18. In combination, an automotive vehicle, a vehicle frame, and means for propelling said vehicle, a body mounted upon said frame for tipping with respect thereto, selective hydraulic means for tipping said body, a movable gate in said body to close the same, and a means for moving said gate, said means adapted to move the gate rearwardly for opening and forwardly for closing and for packing, the bottom of said body shaped to provide a main retaining pocket and a receiving pocket, the latter being bounded forwardly by a raised portion separating it from the retaining pocket and bounded at the rear by a raised lip adapted to prevent spilling of the contents.

19. In combination, an automotive vehicle, a vehicle frame, and means for propelling said vehicle, a closed body mounted upon said frame for tipping with respect thereto, said body having a fixed bottom, top, sides and one end and being open at its rear, selective hydraulic means for tipping said body to the rear, a movable gate pivoted in the open rear end of said body to close the same, and a hydraulic means for moving said gate, said hydraulic means adapted to move the gate rearwardly for opening and forwardly for closing and for packing, the bottom of said body shaped to provide a main retaining pocket and a receiving pocket, the latter being bounded forwardly by a raised portion separating it from the retaining pocket and bounded at the rear by a raised lip adapted to prevent spilling of the contents.

LESTER W. WACHTER.
LAWRENCE E. WALKER.